United States Patent [19]

Pisapio

[11] Patent Number: 4,728,054

[45] Date of Patent: Mar. 1, 1988

[54] FISHING REEL

[75] Inventor: Albert H. Pisapio, Mississauga, Canada

[73] Assignee: Judith A. Pisapio, Mississauga, Canada

[21] Appl. No.: 866,312

[22] Filed: May 23, 1986

[51] Int. Cl.⁴ .............................................. G10F 1/12
[52] U.S. Cl. ........................ 242/84.51 A; 242/84.51 R
[58] Field of Search ................ 242/84.5 R, 84.5 A, 242/84.51 R, 217, 218, 219, 84.51 A

[56] References Cited

U.S. PATENT DOCUMENTS

| | | |
|---|---|---|
| 1,398,429 | 11/1921 | Harradine . |
| 2,263,237 | 11/1941 | Fiscus .............................. 242/219 |
| 2,858,998 | 11/1958 | Nadolskey . |
| 2,984,432 | 5/1961 | Clark ........................... 242/84.51 R |
| 3,446,453 | 5/1969 | Pachner . |
| 3,478,977 | 11/1969 | Sarah ............................... 242/219 |
| 3,490,714 | 1/1970 | Underwood et al. ........ 242/84.51 R |
| 3,591,107 | 7/1971 | Ferguson .......................... 242/219 |
| 3,708,137 | 1/1973 | Jones ............................... 242/84.5 R |
| 3,989,204 | 11/1976 | Lemery . |
| 4,168,041 | 9/1979 | Moosberg . |

Primary Examiner—Lenard A. Footland
Attorney, Agent, or Firm—Ridout & Maybee

[57] ABSTRACT

A fishing reel having independent reeling and unreeling modes is described. The reel has a spindle which coacts with a ratchet and a pawl for reeling, while a spool positioned on the spindle may be rotated counter to the reeling direction of the spindle at a speed governed by a friction brake located in a recess defined about the spindle in the spool. A handle for reeling the spool is attached to the spindle, and the force of the friction brake is governed by a threaded knob located at the end of the spindle.

19 Claims, 3 Drawing Figures

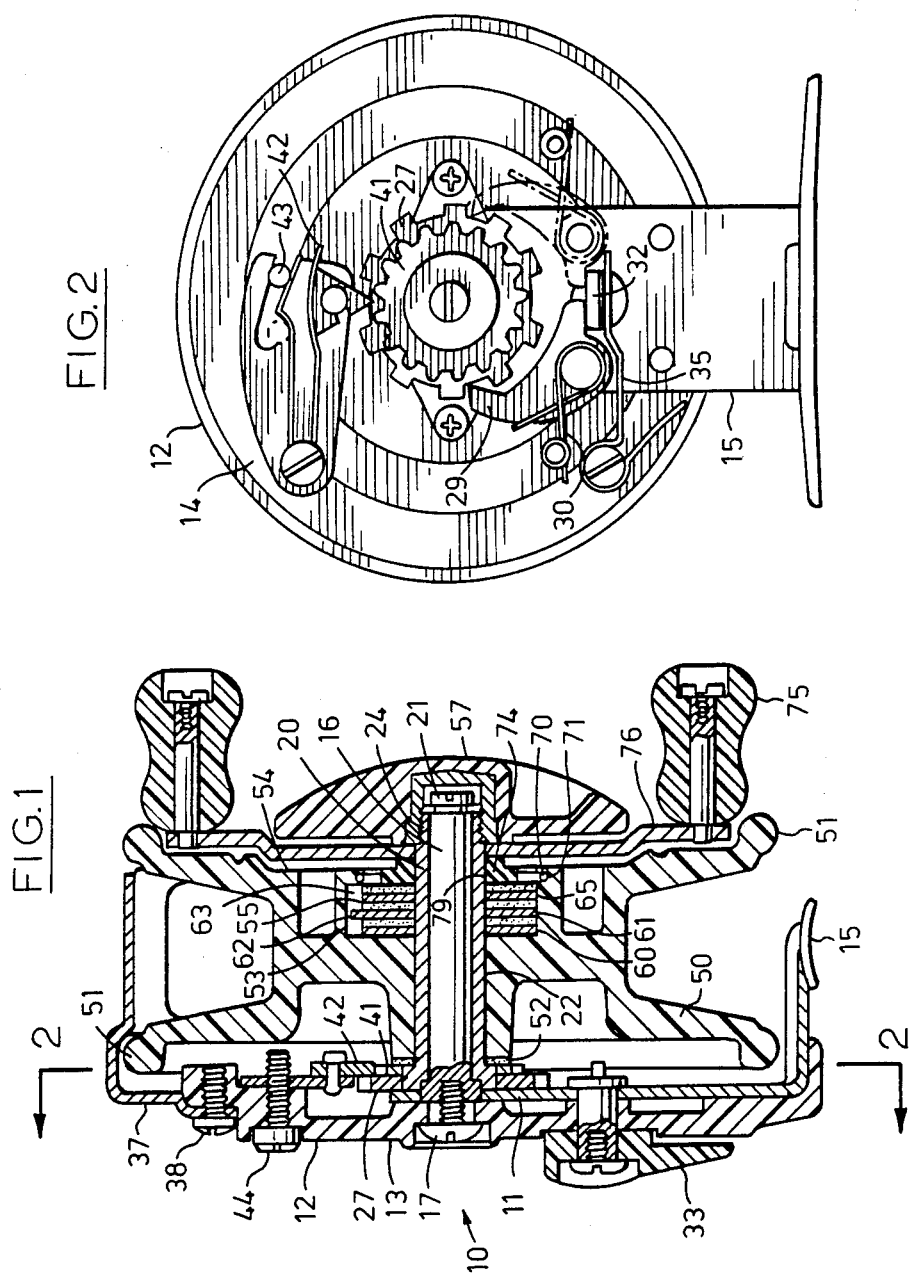

FISHING REEL

The invention relates to a fishing reel, and more particularly to a downrigger/trolling reel used, for example, for salmon fishing.

Typical reels of this type presently available incorporate a drag brake which operates on the reel in both the line retrieve and line pay out modes. This feature is disadvantageous because it makes reeling in a fish a more strenuous activity than need be due to the need to overcome the reel drag force as well as the force produced by the fish. Getting a feel for playing the fish is also difficult with this type of reel, and importantly, it is very difficult to adjust the drag when a fish is hooked because the reel and handle are spinning rapidly as the line pays out.

The present invention overcomes the disadvantages of prior reels by providing a single action reel having independent retrieve and payout modes of operation. The reel spool has both rims exposed so that hand friction may be applied by the fisherman when playing the fish. The handle of the present reel is not attached to the spool so that it does not pose a danger to the fingers and knuckles of the fisherman during line payout. The reel is also constructed to provide right or left handed operation upon making a simple adjustment to the mechanism.

These and other advantages are provided by the reel of the invention, which comprises a back plate having a cylindrical shaft journalled centrally therein and extending normal thereto. A spindle having a flat surface extending longitudinally thereof is mounted on the shaft. A ratchet wheel adjacent the back plate is rotatable with the spindle, and a pawl is pivotally mounted on the back plate for engaging the ratchet wheel. Means are provided for biasing the pawl into engagement with the ratchet wheel so that the spindle may be rotated in only one direction. A spool is positioned on the spindle. The spool has a diameter which extends beyond the back plate, and the spool has a cylindrical recess in the front portion thereof about the spindle. A friction brake comprising a plurality of washers is insertable into the recess of the spool. The brake has at least a washer positioned at the bottom of the recess, over which is provided a washer rotatable with the spool, over which is a washer rotatable with the spindle, and over which is a washer of a friction material. A handle is attached to the shaft so that the shaft may be rotated thereby, and a friction brake knob is threaded onto the end of the spindle for applying pressure to the washers of the friction brake.

BRIEF DESCRIPTION OF THE DRAWINGS

FIG. 1 is a cross sectional view of a reel in accordance with the invention;

FIG. 2 is a plan view taken along line 2—2 of FIG. 1; and

A preferred embodiment of the reel in accordance with the invention will hereinafter be described with reference to the drawings. Referring to FIG. 1, the reel 10 comprises a back plate 11 preferably made of metal such as stainless steel. The back plate 11 is enclosed about its outer surface by a frame member 12 which is circular in shape (see FIG. 2) having an outer surface 13 and an inner surface 14. A foot 15 for attaching the reel 10 to a rod extends from the back plate 11 which in turn is affixed to the inner surface 14 of the frame 12. A cylindrical shaft 16 having a longitudinal axis is journalled in the back plate 11 centrally of the circular frame 12 and is secured in place by a screw 17 extending through the frame 12. The shaft 16 extends generally normal to the back plate 11. A more preferred construction is to fasten the shaft 16 to the back plate 11 with a screw and then fasten the back plate 11 to the frame 12.

Figure 3:
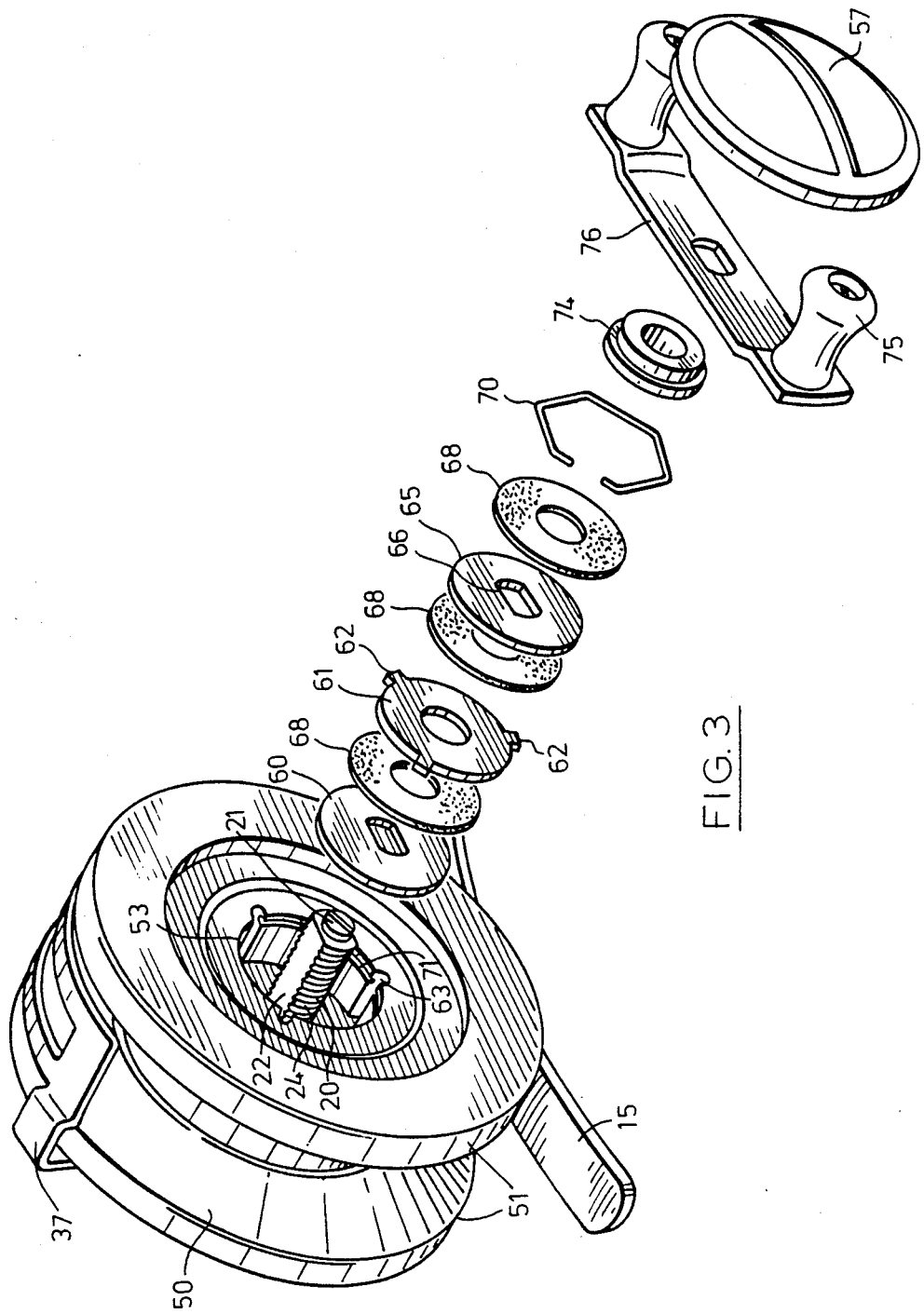
FIG. 3 is a perspective view partially exploded to show details of the friction brake feature of the invention.

A spindle 20 is mounted on the shaft 16 and held in place by a cap screw 21 or other suitable means such as a cir clip ring. The spindle 20 is rotatable about the longitudinal axis of the shaft 16, and the spindle 20 has at least one flat surface 22 provided along its length (see FIG. 3). The outer end 24 of the spindle 20 is threaded.

A ratchet wheel 27 (FIG. 2) is rotatable with the spindle 20, the ratchet wheel 27 being positioned adjacent the inner surface 14 of the back plate 11 and preferably spaced slightly therefrom. A pawl 29 is pivotally mounted on the back plate 11 and is biased into contact with the ratchet wheel 27 by a spring 30. The pawl 29 may be disengaged from contact with the ratchet wheel 27 by the operation of a cam 32 pivotable by means of a knob 33 located on the outer surface 13 of the back frame 12. The cam 32 is biased by a spring 35 fastened to the inner surface 14.

The pawl 29 and spring 30 may be moved to an opposing position with respect to the ratchet wheel 27 as shown in FIG. 2 in broken lines. This transpositionability of the pawl 29 and spring 30 enable the reel 10 to be operated either right or left handedly. The square tooth design of the ratchet wheel 27, as shown in FIG. 2, is required for this feature of the reel to work in this way. Thus, as shown in FIG. 2, the ratchet wheel 27 may be affixed to the spindle 20. However, it will be clear to a person skilled in this art that a conventional ratchet wheel having angled teeth may be used, but to achieve ambidextrous convertibility, such a ratchet wheel would have to be reversed or turned over upon movement of the pawl 29.

In conjunction with this ambidextrous feature of the reel 10, a line guide 37 is attached to the outer surface 13 of the frame 12 by screws 38. The guide 37 may also be moved to correspond to right or left handed operation of the reel.

A clicker wheel 41 may be positioned on the spindle 20 and be rotatable therewith. The clicker wheel 41 is a toothed wheel or gear wheel and is situated over the ratchet wheel 27. A clicker mechanism 42 is engageable with the wheel 41 to make a clicking sound as the spindle 20 and wheel 41 rotate. The clicker mechanism 42 is spring biased so that movement of a boss 43 by means of a button 44 located on the outer surface 13 of the frame 12 allows the clicker 42 to be engaged or disengaged from the wheel 41. The clicker 42 provides a sound signal to the fisherman in relation to the rotation of the spindle 20.

A spool 50 having rims 51 is provided on the spindle 20 and is rotatable about the spindle 20. A washer 52 may be provided between the spool 50 and the clicker wheel 41. There is no mechanical connection between the spindle 20 and the spool 50, but rather, the spool 50 is caused to rotate with or independently of the spindle 20 in accordance with the balance of forces acting on it including its frictional interaction with the spindle 20. It may be preferable to affix the clicker wheel 41 to the spool 50 rather than positioning it independently on the spindle 20. In accordance with this preferred configuration on the spool 50, the wheel 41 can function under free spooling conditions to provide sufficient drag to the spool 50 to prevent backlash tangling of the line during rapid payout.

The spool 50 has a recess 53 defined in its top surface 54 into which is positioned drag brake means 55. The drag brake 55 preferably comprises a series of washers which coact with a spring means and a friction brake knob 57 which is screwed onto the end 24 of the spindle 20 to provide a compressive force to the washers. Minimally, the drag brake 55 comprises a washer 60 positioned about and rotatable with the spindle 20 and engaging the bottom surface of the recess 53, over which is positioned a washer 61 rotatable with the spool 50 by means of teeth 62 insertable in grooves 63 defined in the recess wall. A third washer 65 is positioned over the washer 61, the washer 65 like the washer 60 having a central aperture defining a flat edge 66 engageable with the flat side 22 of the spindle 20. Of course, where the spindle 20 has more than one flat side 22 as in FIG. 3, the washer 65 will have corresponding flat edges 66. Thus, the washers 60 and 65 rotate with the spindle 20 and the washer 61 rotates with the spool 50, and braking friction is generated by compression of the washers 60, 61 and 65 by the knob 57. In order to make efficient use of the frictional forces provided by this drag brake means 55, it is preferred to include minimally a washer 68 of frictional material such as over the third washer 65, and most preferably, such washers 68 are provided between all three washers 60, 61 and 65. The use of friction washers 68 greatly reduces the wear on the washers 60, 61 and 65, which may conveniently be made of metal such as brass, and these friction washers 68 allow the brake means 55 to possess a wide range of braking sensitivity from near free spooling to essentially a spool locked arrangement. The washers of the drag brake 55 are held in place by a wire retainer 70 positionable in a peripheral groove 71 formed near the top of the recess 53.

Of course, it will be understood by the skilled reader that the drag brake 55 only operates to place a braking force on the unreeling rotation of the spool 50 when the cam 29 is engaging the ratchet wheel 27 so that the spindle 20 cannot rotate in the unreeling direction. As shown in FIGS. 1 and 3, a spring means in the form of a rubber washer 74 is positioned about the spindle 20 between the top washer 68 and the knob 57. Such spring means as the rubber washer 74 provide a greater sensitivity to the drag brake 55 so that a full range of resistance to spool rotation in the direction of line payout may be readily achieved. Clearly, the rubber washer 74 may be exchanged for a metal spring washer, a spring loaded nut within the knob 57 itself or other equivalent means.

Presently, the most preferred configuration for the drag brake 55 comprises seven washers of alternating brass and friction material. The preferred configuration includes an additional washer like the washer 61 at the bottom of the stack of washers with a friction washer 68 between it and the washer 60. The top washer then becomes the brass washer 65 rather than a friction washer 68. This preferred arrangement provides two brass washers rotatable with the spindle 20 and two brass washers rotatable with the spool 50. When used in association with a spring loaded knob 57 or the like, the preferred drag brake 55 provides a very smooth operation and a great degree of sensitivity.

A handle 75 is provided toward the end of the spindle 20 and is operable to turn the spindle 20. As shown in FIG. 1, the handle 75 comprises an arm 76 having a central aperture shaped to engage and rotate with the spindle 20 between the drag brake 55 and the knob 57.

From the foregoing description, the operation of the reel 10 will be understood as follows. The rotation of the spool 50 is governed by separate means in the reeling and unreeling modes. The drag brake 55 is set by adjusting the knob 57 to the desired tension for unreeling of line from the spool 50. This drag tension has no bearing on the force needed to reel in the line since the handle 75 is attached to the spindle 20 and not the spool 50. Reeling in, then, is effortless for slack line since the drag brake 55 does not affect the rotation of the spindle 20, but provides a frictional engagement of the spool 50 and the spindle 20. Reeling in line having tension thereon may result in some back slipping of the spool 50 about the spindle 20 depending on the drag force set by the brake 55. This is a desirable feature for enabling the fisherman to play a fish on the line without being overly concerned with breaking the line. Additionally, the drag force may be adjusted once a fish has been hooked by turning the knob 57 even while the spool 50 is unreeling. Because the handle 75 does not rotate in the unreeling mode when the pawl 29 engages the ratchet wheel 27, there is no danger that the fisherman may injure his fingers or hand by trying to adjust the drag brake 55 under such conditions.

An important feature in a reel enabling a fisherman to have a greater degree of control when playing a fish, is the ability to palm the unreeling spool so as to exert additional drag thereon from friction applied by the fisherman's hand or palm. The present reel 10 provides both rims 51 accessable to the fisherman for palming. This feature is allowed by having the frame 12 of a diameter less than that of the spool 50. The palming technique may be used as the only braking force applied to the spool 50 when the reel 10 is in the free wheeling mode, i.e. when the pawl 29 is disengaged from the ratchet wheel 27, or as an added braking force to the spool 50 when the drag brake 55 is engaged.

Modifications to the reel 10 described herein as the preferred embodiment of the invention will be apparent to the skilled person. Accordingly, the scope of the invention is particularly defined in the following claims.

I claim:

1. A fishing reel, comprising:
   a back plate having a generally circular frame member attached to it;
   a cylindrical shaft defining a longitudinal axis, the shaft extending from an inner surface of the back plate;
   a spindle mounted on the shaft and rotation about the longitudinal axis thereof, the spindle having a longitudinal flat surface and being threaded toward its outer end;
   a ratchet wheel positioned adjacent the inner surface of the back plate and being rotatable with the spindle;
   a pawl pivotally mounted on the inner surface of the back plate;
   means for biasing the pawl toward engagement with the ratchet wheel to prevent rotation of the spindle in one direction, the pawl and ratchet wheel being reversible to accommodate a ratcheted reeling rotation of the spindle in either of the two possible directions;

a cam engaging the pawl so that rotation of the cam causes the pawl to engage or disengage the ratchet wheel;

a spool positioned on the spindle and being freely rotatable on the spindle, the spool having circular rims extending beyond the periphery of the frame so that manual pressure may be applied thereto for the purpose of imparting drag to the unreeling rotation of the spool, the spool defining a cylindrical recess about the axis of said shaft, the recess being open to the threaded end of the spindle;

a drag brake being capable of providing a frictional engagement of the spool and the spindle, comprising a first washer rotatable with the spindle being positioned at the bottom of the recess, over which is positioned a washer rotatable with the spool, over which is positioned a second washer rotatable with the spindle, and a washer of a friction material being provided over all said washers;

a handle coacting with the spindle so that the spindle may be rotated by the handle; and a drag brake knob threaded to screw onto the end of the spindle for applying pressure to the washers of the drag brake.

2. A fishing reel as claimed in claim 1, further comprising a foot for attaching the reel to a pole, said foot extending from the back plate.

3. A fishing reel as claimed in claim 1, further comprising a line guide attached to the frame, said guide extending just in front of the spool between the spool rims.

4. A fishing reel as claimed in claim 1, wherein the spindle has two flat surfaces along its length situated opposite one another.

5. A fishing reel as claimed in claim 1, wherein the ratchet wheel has square teeth.

6. A fishing reel as claimed in claim 1, further comprising a clicker which provides an audible signal upon rotation of the spool.

7. A fishing reel as claimed in claim 6, wherein the clicker comprises a toothed wheel attached to and rotatable with the spool coacting with a clicker means attached to the inner surface of the back plate or frame.

8. A fishing reel as claimed in claim 1, wherein the cam rotation is governed by a knob located on the outer surface of the frame.

9. A fishing reel as claimed in claim 1, wherein the cam is biased by a spring into disengagement with the pawl.

10. A fishing reel as claimed in claim 1, wherein the pawl is biased by a spring.

11. A fishing reel as claimed in claim 1, further comprising a clicker which provides an audible signal upon rotation of the spindle.

12. A fishing reel as claimed in claim 11, wherein the clicker comprises a toothed wheel rotatable with the spindle coacting with a clicker means attached to the inner surface of the back plate or frame.

13. A fishing reel as claimed in claim 1, wherein the washers other than the friction washer are metal.

14. A fishing reel as claimed in claim 13, wherein the drag brake is a stack of washers comprising, a first washer rotatable with the spool, a friction washer, a first washer rotatable with the spindle, a friction washer, a second washer rotatable with the spool, a friction washer, and a second washer rotatable with the spindle being uppermost in the stack.

15. A fishing reel as claimed in claim 14, wherein the washers rotatable with the spool have peripheral teeth insertable in longitudinal grooves formed in the recess wall, and the washers rotatable with the spindle each have a central opening having a flat edge for engaging the flat surface of the spindle.

16. A fishing reel as claimed in claim 1, wherein in the drag brake, the washer rotatable with the spool has peripheral teeth insertable in longitudinal grooves formed in the recess wall, and the washers rotatable with the spindle each have a central opening having a flat edge for engaging the flat surface of the spindle.

17. A fishing reel as claimed in claim 16, wherein the drag brake is a stack of washers, comprising a first washer rotatable with the spindle, a friction washer, a washer rotatable with the spool, a friction washer, a second washer rotatable with the spindle, and a friction washer being uppermost in the stack.

18. A fishing reel as claimed in claim 1, further comprising a spring means associated with the friction brake knob thereby providing a greater sensitivity to the range of resistance obtainable from the drag brake.

19. A fishing reel as claimed in claim 1, wherein the handle comprises an arm defining an aperture having a flat edge for engaging the flat surface of the spindle, and a knob rotatably attached to each end of the arm.

* * * * *